Inventors:
A. A. Wilson.
A. D. Robertson.
By Whiteley and Ruckman
Attorneys.

Feb. 15, 1927.
A. A. WILSON ET AL
1,618,036
VACUUM CONTROLLED SHOCK ABSORBING DEVICE
Filed Aug. 2, 1926   2 Sheets-Sheet 2
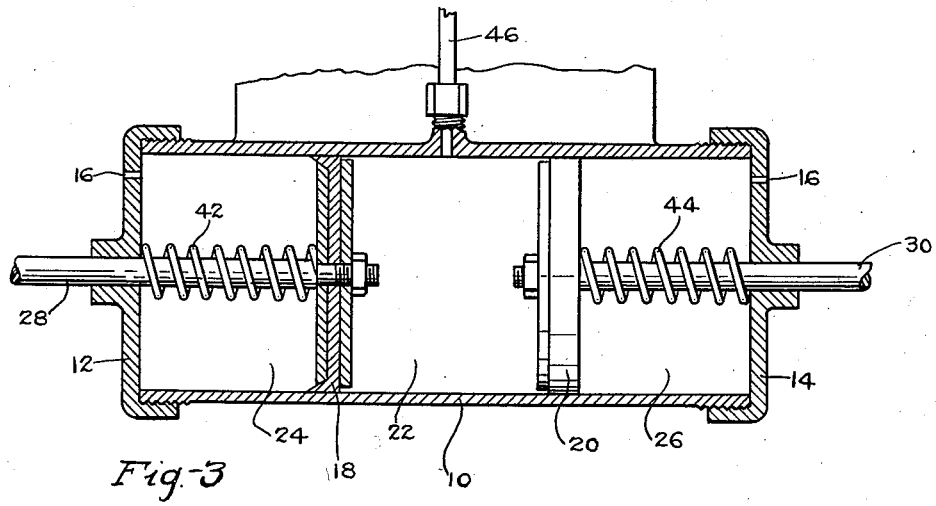
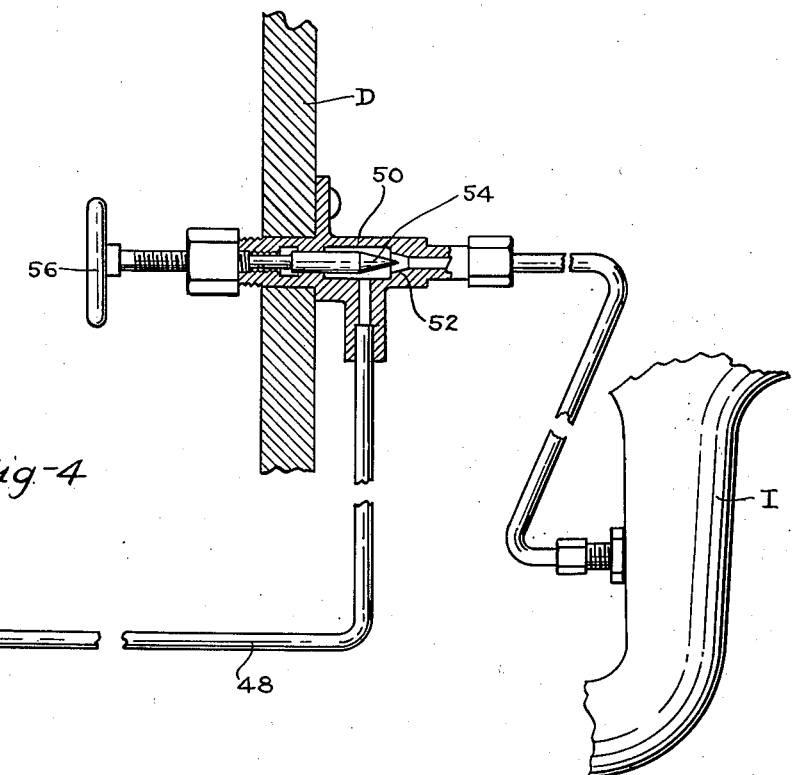
Inventors:
A. A. Wilson,
A. D. Robertson.
By Whiteley and Ruckman
Attorneys.

Patented Feb. 15, 1927.

1,618,036

UNITED STATES PATENT OFFICE.

ALBERT A. WILSON AND ALEXANDER D. ROBERTSON, OF MINNEAPOLIS, MINNESOTA.

VACUUM-CONTROLLED SHOCK-ABSORBING DEVICE.

Application filed August 2, 1926. Serial No. 126,371.

Our invention relates to vacuum controlled shock-absorbing devices. It is well known that when automobiles which are being driven strike bumps and depressions in the highway, the upward movement of the vehicle springs unless restrained causes a rebound which not only shakes up the occupants of the automobile, but which sometimes cause breakage of the springs. Before the time of our invention, in order to prevent the rebound, it has been cutomary to employ auxiliary springs and shock absorbers of the friction type, and also the plunger type. An object of our invention is to provide a shock absorber which depends for its action upon the vacuum produced by the suction of the engine while running. When this vacuum is on due to the running of the engine, the vehicle springs are placed under tension. When the engine is not running, tension on the vehicle springs and shock absorber connections is relieved. Another object is to provide a shock absorbing device, the tensioning effect of which is equalized for all four wheels of the vehicle. Another object is to provide means readily accessible to the driver and by which the tensioning action on the springs may be eliminated whenever desired so that the vehicle springs will then function the same as though no shock absorbing device were present.

The full objects and advantages of our invention will appear in connection with the detailed description thereof, and the novel features of our inventive idea will be particularly pointed out in the claims.

In the accompanying drawings which illustrate one form in which our invention may be embodied,—

Figure 1:
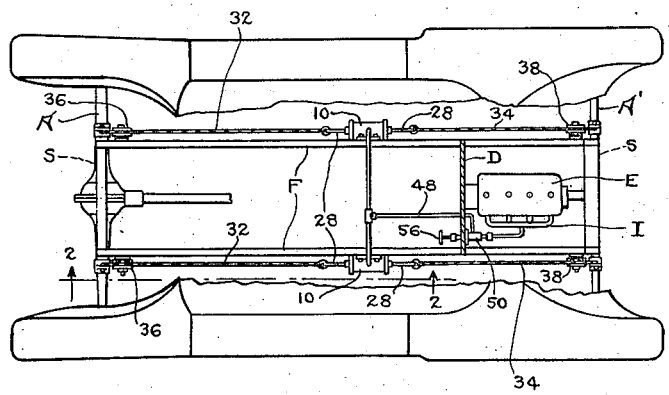
Figure 2:
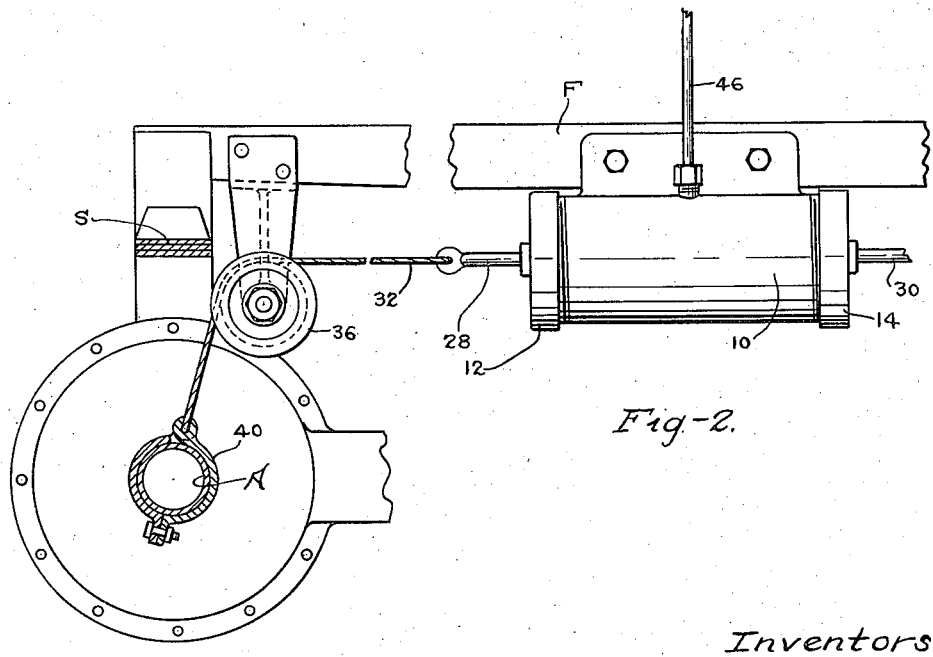

Fig. 1 is a top plan view of an automobile showing our device applied thereto. Fig. 2 is a view on an enlarged scale in section on the line 2—2 of Fig. 1 and showing the main portion of our device in side elevation. Fig. 3 is a view of the main portion of the device in central longitudinal section. Fig. 4 is a detail view illustrating the manner in which the device may be connected with the intake manifold of the engine.

It will be understood by referring to the drawings that we provide one or more cylinders 10. In the particular embodiment shown, there are two of these cylinders secured to the frame F one on each side of the automobile which in the type chosen for illustrative purposes has transverse springs S. The cylinder 10 is substantially closed by rear and front heads 12 and 14 which are provided with air vents 16. Working in the cylinder are rear and front pistons 18 and 20 spaced from each other to provide a chamber 22 adapted to be subjected to vacuum in a manner which will presently be described. Between the piston 18 and the head 12 of the cylinder, there is an air chamber 24 while between the piston 20 and the head 16 of the cylinder, there is an air chamber 26. A rod 28 secured to the piston 18 extends slidably through the head 12 while a rod 30 secured to the piston 20 extends slidably through the head 14. Cables 32 and 34 are secured respectively to the rods 28 and 30. These cables pass over sheaves 36 and 38 and at their outer ends are secured respectively in suitable manner to the rear axle case A and the front axle case A'. As shown in Fig. 2, these cable ends are secured to divided rings 40 which are clamped around the axle case. The rods 28 and 30 between the pistons and the heads of the cylinder are surrounded respectively by coiled springs 42 and 44, the purpose of which is to take up slack in the cables particularly when the automobile is standing. The cylinder is connected by a pipe line with the intake manifold I of the engine. In the embodiment shown having two cylinders, the middle portions of the cylinders, or in other words, the chambers 22, are connected with each other by a pipe 46 which in turn is connected by a pipe 48 with a valve casing 50 attached to the dash D. The valve casing 50 contains a valve seat 52 with which is adapted to cooperate a needle valve 54 having a hand wheel 56 by which it may be turned for regulating purposes. The valve casing beyond the seat 52 is connected by a pipe 58 with the intake manifold I of the engine E.

The operation and advantages of our invention will be readily understood in connection with the foregoing description. The device may be readily installed in automobiles already in use or may be provided as part of the standard equipment when the automobiles are built. It will be understood by reference to Fig. 3 that the chamber 22 will be subjected to vacuum when the engine is running and that this will cause the pistons to be drawn inwardly in the cylinder, thereby causing a pull to be exerted on the cables so that the vehicle springs will be pulled downwardly and placed under tension. When the wheels strike a bump or depression, upward movement of the springs is resisted both on account of the vacuum in the chamber 22 and the air in the chambers 24 and 26. It will be understood that when the pistons move inwardly, air is drawn into the air chambers through the openings 16 and when the pistons move outwardly, air is forced out through the openings 16 slowly, so that a cushioning effect is obtained which checks the rebound. When the engine is not running, there is no vacuum in the chamber 22 and the pistons return to neutral position under the influence of the tension to which the vehicle springs were subjected. When the automobile is traveling over smooth pavement, the driver may not wish to maintain the vehicle springs under tension since the desirability of providing the shock absorbing action is not then present and it may be considered preferable to have the vehicle springs operate without restraint. On turning the hand-wheel 56 in the proper direction, the needle valve 54 will be closed and communication between the cylinder and the intake will be shut off. The vacuum in the chamber 22 will thus be relieved thereby taking the tension off the springs. It will be noted further that the shock absorbing effect is equalized for all four wheels of the vehicle since the vacuum is applied uniformly and simultaneously.

We claim:

1. In combination with the internal combustion engine of an automobile, a movable member carried by the automobile and directly responsive to suction produced in the engine cylinders, and a device connected with said movable member for causing a shock absorbing action.

2. In combination with the internal combustion engine of an automobile, a movable member mounted on the frame of the automobile and directly responsive to suction produced in the engine cylinders, and a flexible connection between said movable member and the axle of the automobile.

3. In combination with the internal combustion engine of an automobile, a cylinder mounted on the automobile, a piston in said cylinder, a pipe connection between said cylinder and the intake of the engine whereby said piston is subjected to suction produced in the engine cylinders, and a device connected with said piston for causing a shock absorbing action.

4. In combination with the internal combustion engine of an automobile, a cylinder mounted on the frame of the automobile, a piston in said cylinder, a pipe connection between said cylinder and the intake of the engine whereby said piston is subjected to suction produced in the engine cylinders, and a flexible connection between said piston and the axle of the automobile.

5. A shock absorbing device for automobiles comprising a movable member adapted to be subjected to suction occurring in the intake of the engine, means connected with said member for causing a shock absorbing action, and means within reach of the driver for closing the communication with said intake.

6. A shock absorbing device for automobiles comprising a cylinder mounted on the automobile, a piston in said cylinder having a vented air chamber on one side thereof, a spring tending to urge said piston inwardly in said cylinder to thereby enlarge said air chamber, and a device connected with said piston for causing a shock absorbing action.

7. In combination with the internal combustion engine of an automobile, a movable member carried by the automobile and adapted to be moved by power derived from the engine, and a device connected with said movable member for causing a shock absorbing action.

8. In combination with the internal combustion engine of an automobile, a cylinder mounted on the automobile, a piston in said cylinder having a vacuum chamber on one side thereof and a vented air chamber on the other side thereof, a pipe connection between said vacuum chamber and the intake of the engine whereby said piston is subjected to suction to draw air into said air chamber, and a device connected with said piston for causing a shock absorbing action.

9. In combination with the internal combustion engine of an automobile, a cylinder mounted on the automobile, two pistons in said cylinder having a vacuum chamber between them and vented air chambers on the outer sides thereof, a pipe connection between said vacuum chamber and the intake of the engine whereby said pistons are subjected to suction to draw air into said air chambers, connections between one of said pistons and the rear axle of the automobile, and connections between the other of said pistons and the front axle of the automobile, said connections causing a shock absorbing action.

In testimony whereof we hereunto affix our signatures.

ALBERT A. WILSON.
ALEXANDER D. ROBERTSON.